Patented Feb. 3, 1942

2,272,159

UNITED STATES PATENT OFFICE 2,272,159

PURIFICATION OF 3-PICOLINE

Francis E. Cislak and William R. Wheeler, Indianapolis, Ind., assignors to Reilly Tar & Chemical Corporation, Indianapolis, Ind., a corporation of Indiana No Drawing. Application July 2, 1941, Serial No. 400,798

6 Claims. (Cl. 260—290)

Our invention relates to the purification of 3-picoline from such contaminants as 4-picoline and 2,6-lutidine with which it is commonly associated as ordinarily prepared from coal tar.

We have found that by heating with sulfur an impure 3-picoline, containing 4-picoline and/or 2,6-lutidine, and sometimes containing the contaminants even in predominating amount, the contaminants are transformed by reaction with the sulfur into complex non-volatile materials, while the 3-picoline remains substantially unattacked by the sulfur.

By this selective reaction with sulfur, we change the mixture from one in which the components are very difficult to separate one from another, due to their close resemblance in physical and chemical properties, into one in which the components are very easy to separate one from another by common and simple methods, such for instance as distillation. That is, a mixture of 3-picoline with either or both of 4-picoline and 2,6-lutidine is difficult to separate into its components, to get 3-picoline in substantially pure form, because all these components boil at very nearly the same temperature (about 143–144° C.); but after the selective reaction with sulfur, that converts the 4-picoline and the 2,6-lutidine into the complex and non-volatile reaction products, those reaction products have quite different properties, both chemical and physical, from the remaining unattacked 3-picoline, so that separation of the 3-picoline from those reaction products of sulfur with 4-picoline and 2,6-lutidine may readily be effected by physical or chemical means.

These reactions of sulfur with 4-picoline and 2,6-lutidine form a black and pitch-like product, which is insoluble in water and which does not distil even at a temperature considerably higher than the boiling point of 3-picoline. In consequence, it is possible readily to separate the unattacked 3-picoline from this reaction product either by extraction with water, since 3-picoline is miscible in all proportions with water, or by distillation; and we prefer the latter.

No precise temperature is necessary for the reaction; but a temperature above 100° C. is desirable.

We prefer to carry out the reaction at about the boiling temperature of 3-picoline at atmospheric pressure (about 143–144° C.), at which temperature the sulfur (which melts at about 119° C.) is in liquid phase; for we can obtain and maintain these conditions readily by use of a reflux condenser. If a lower temperature is used the rate of reaction is slower, and if a higher temperature is used the rate of reaction is more rapid. If desired, we may pass the vapor of the impure 3-picoline over molten sulfur, or may pass mixed vapors of impure 3-picoline and sulfur through a heated reaction chamber.

Further, we may add a sulfurating catalyst to the reaction mixture to hasten the reaction, such for instance as an alkali-metal sulfide, oxide, or hydroxide.

The following are examples of our process:

*Example 1.*—A mixture of 48 gms. (1.5 moles) of sulfur and about 97.4 gms. (1 mole of total base) of a refined picoline cut containing approximately 39% of 3-picoline, 38% of 2,6-lutidine, and 23% of 4-picoline, is refluxed for about 22 hours, at atmospheric pressure. The sulfur reacts with the 2,6-lutidine and the 4-picoline, though very little if at all with the 3-picoline, to produce a complex non-volatile reaction material such as above referred to. During the reaction the solution becomes dark in color, and hydrogen sulfide is given off. After the reaction, we can readily separate the unreacted base from that reaction product. This may be done by extracting the mixture with water, to dissolve out the unreacted base; or by distilling the mixture to distil off the unreacted base and leave the reaction product as a black pitch-like residue. Upon such distillation we get a greatly purified 3-picoline, of about 90% purity.

By repeating the process, we may further increase the purity of the 3-picoline.

*Example 2.*—A mixture of 12 gms. (0.37 mole) of sulfur and 93 gms. (about 1 mole of total base) of a refined 3-picoline containing approximately 66% of 3-picoline and approximately 34% of 4-picoline is refluxed for about 64 hours, at atmospheric pressure. Hydrogen sulfide is evolved, and the solution becomes dark in color. The unchanged picoline is separated from the reaction product as in Example 1, most conveniently by distillation; and is a 3-picoline of high purity. The residue, which is mainly the reaction product of sulfur and 4-picoline, is pitch-like and non-volatile.

*Example 3.*—A mixture of 16 gms. (0.5 mole) of sulfur, 0.15 gm. of sodium hydroxide, and 93 gms. (about 1 mole of total base) of a refined 3-picoline of the type used in Example 2 (about 66% 3-picoline and 34% 4-picoline), is refluxed for about 24 hours, at atmospheric pressure. Reaction occurs as in Example 2, but rather more rapidly because of the catalytic action of the co-present sodium compound. The unreacted picoline is recovered from the reaction mixture as in Examples 1 and 2, conveniently by distillation, and is a 3-picoline of high purity, of about 93–95%.

We claim as our invention:

1. The process of purifying 3-picoline that is contaminated by the co-presence of at least one of the bases 4-picoline and 2,6-lutidine, which consists in heating the contaminated 3-picoline with sulfur, and separating the unreacted 3-picoline from reaction products.

2. The process of purifying 3-picoline that is contaminated by the co-presence of at least one of the bases 4-picoline and 2,6-lutidine, which consists in heating the contaminated 3-picoline with sulfur, and separating the unreacted 3-picoline from reaction products by distillation.

3. The process of purifying 3-picoline that is contaminated by the co-presence of at least one of the bases 4-picoline and 2,6-lutidine, which consists in heating the contaminated 3-picoline with sulfur in the presence of a sulfurating catalyst, and separating the unreacted 3-picoline from reaction products.

4. The process of purifying 3-picoline that is contaminated by the co-presence of at least one of the bases 4-picoline and 2,6-lutidine, which consists in refluxing the contaminated 3-picoline with sulfur at atmospheric pressure, and separating the unreacted 3-picoline from the reaction products.

5. The process of purifying 3-picoline that is contaminated by the co-presence of at least one of the bases 4-picoline and 2,6-lutidine, which consists in refluxing the contaminated 3-picoline with sulfur, and separating the unreacted 3-picoline from the reaction products.

6. The process of purifying 3-picoline that is contaminated by the co-presence of at least one of the bases 4-picoline and 2,6-lutidine, which consists in selectively reacting with sulfur to produce reaction products of the contaminants with the sulfur while leaving the 3-picoline substantially unattacked, and separating the unattacked 3-picoline from the reaction products.

FRANCIS E. CISLAK.
WILLIAM R. WHEELER.